May 23, 1961 P. F. M. PITAVY 2,985,095
COOKING UTENSIL ADAPTED FOR A NUMBER OF CULINARY USES
Filed March 7, 1958 2 Sheets-Sheet 2
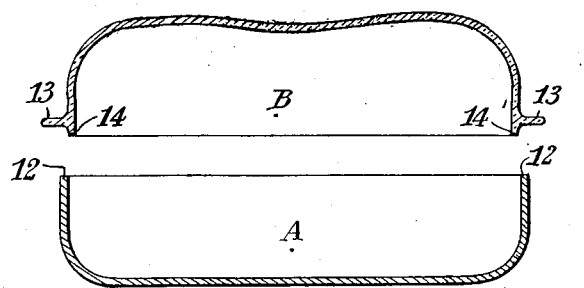
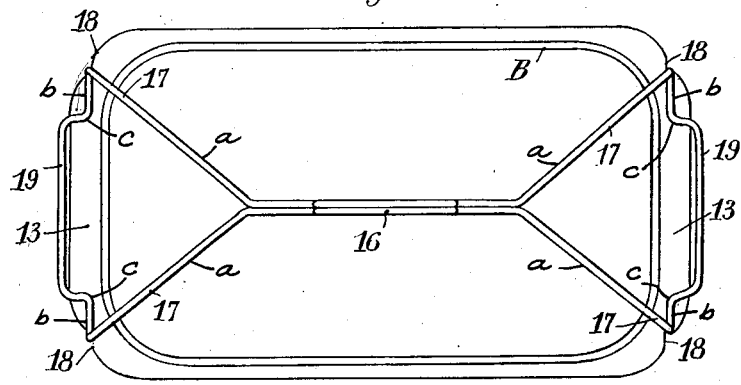
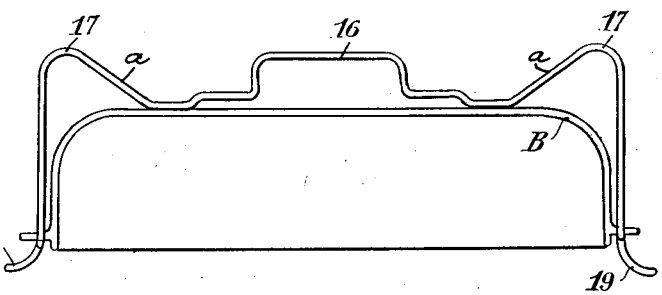
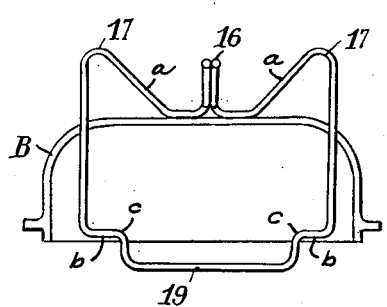

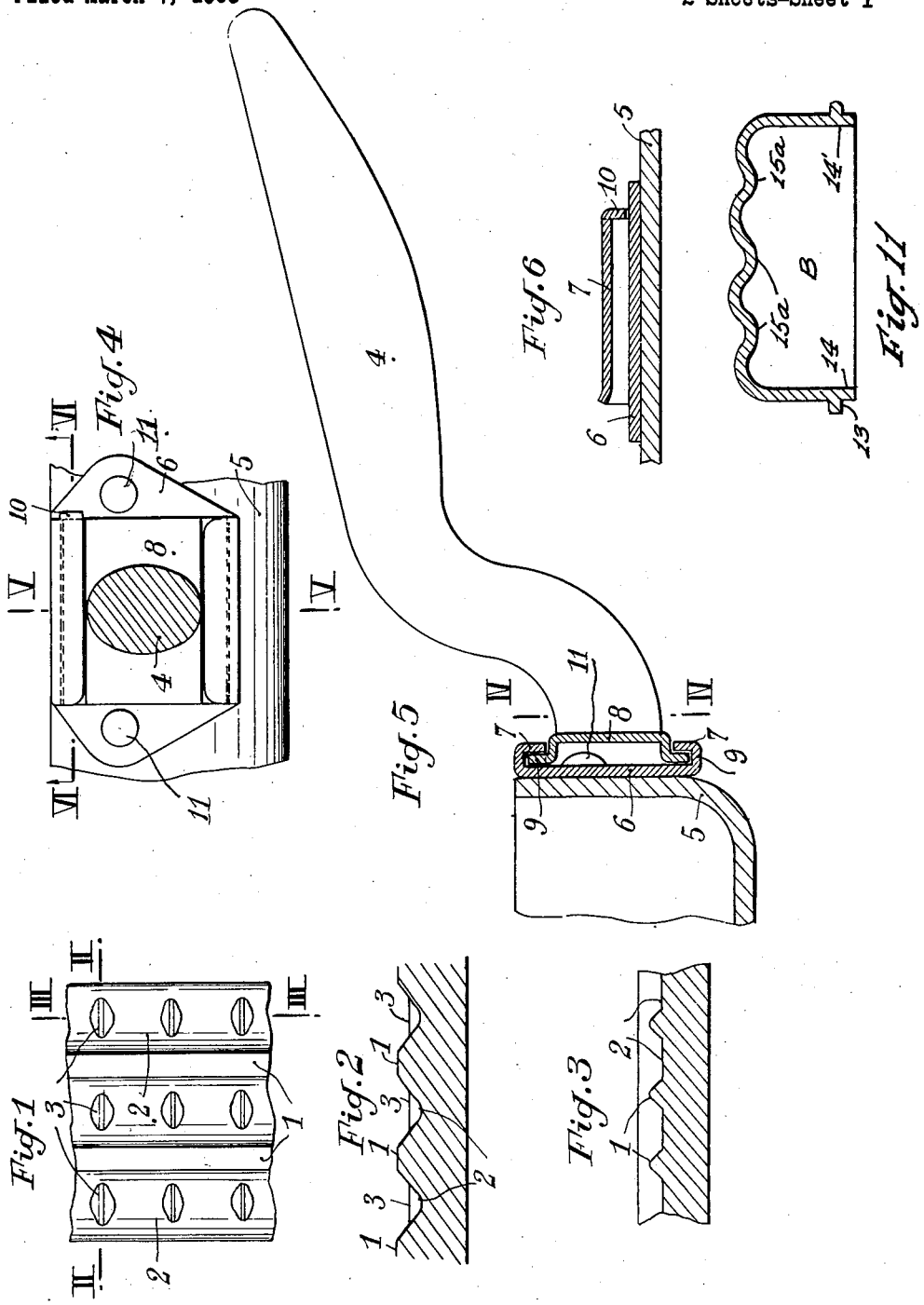

United States Patent Office 2,985,095
Patented May 23, 1961

2,985,095
COOKING UTENSIL ADAPTED FOR A NUMBER OF CULINARY USES

Pierre Francois Marie Pitavy, Chalon-sur-Saone, France, assignor to Societe Anonyme dite: Societe Industrielle de Ferblanterie, Paris, France, a corporation of France Filed Mar. 7, 1958, Ser. No. 719,906
Claims priority, application France Mar. 18, 1957
5 Claims. (Cl. 99—341)

The present invention has for its object a cooking utensil adapted for a number of culinary uses, which is characterised in that it is essentially made up of two pieces, of which one is a frying pan with a thick bottom and the other a roasting dish; these two parts which, with the aid of accessories with which they are supplied, can be used separately for many different culinary uses, are adapted to each other in such a way as to form, by the combined effect of their individual characteristics, a casserole having the greatest possible advantages. In accordance with a preferred form of embodiment, the first of these pieces is of aluminum and the second is of fireproof glass.

In principle, this first piece is a grilling and frying pan of any desired shape (round, oval, rectangular) with a thick bottom; it is of course well known that in this type of article, the thick bottom has two important advantages as compared with the old type of frying pan in thin steel sheet, since in the first place the thick bottom does not become deformed due to the effect of expansion, and in the second place it ensures diffusion of the heat over the whole surface of the pan, preventing burning in the zone of the source of heat: the flame of a gas burner for example.

Frying pans with thick bottoms, usually of aluminum, have been produced for several years; they have been provided with two kinds of impressions on the inner surface of the bottom. One type is provided with a large number of small shallow dimples close together which form small cells intended to contain fat; the others are provided with circular or straight ribs forming deep grooves and intended to ensure that the meat to be grilled only makes contact with the tops of the ribs; this enables grilling to be done without any fat.

The first piece in accordance with the invention combines all the advantages, by reason of the fact that its inner surface is provided with deep ribs, the bottoms of the grooves being themselves provided with small cells intended to hold fat, or with any other equivalent means for preventing the fat from flowing in a groove with the slightest tilting of the pan, and retaining a thin film of oil at the bottom of each groove.

The second main piece is a roasting dish which can be made of thin metal since is is intended for use in the oven and does not have to withstand the violent attack of a gas burner and is not liable either to deformation or to burning.

In accordance with the invention, this dish has the same dimensions and general shape as the first piece, so that this thin dish can be used in an inverted position on the frying pan, in addition to its use as a roasting dish, so that by serving as a cover it forms with the first dish a closed "cooker" similar to the usual casseroles of cast-iron, enameled cast-iron or aluminum.

In accordance with a preferred form of embodiment, this roasting dish is of fireproof glass instead of metal. It is well known that the use of kitchen articles of glass, appreciated for their cleanliness and their long retention of heat, has recently become more and more extensive. It is especially in the case of roasting dishes that glass offers the greatest number of advantages. In this form of embodiment, the co-operation of the two pieces, metal frying pan and glass cover, forms a casserole of maximum qualities. On the one hand, this "metal-glass" cooking combination is very logical, since the highly-conductive metal absorbs and rapidly diffuses the heat which it receives from the burner into the inside of the closed space, whilst the glass cover which is a bad conductor of heat, keeps in the heat by acting as a heat-insulator, thus giving a substantial economy in fuel. On the other hand, the upper part of the cooker in transparent glass enables the cooking of the food to be easily watched without it being necessary to remove an opaque cover, giving a visibility which is in no way to be compared with the very indifferent visibility obtained with culinary utensils with opaque walls by means of the window with which some of these articles are provided.

The invention is illustrated by way of example only and without implied limitation in the accompanying drawings, in which:

Fig. 1 is a plan view of a part of the bottom of the grilling and frying pan.

Figs. 2 and 3 are views in cross-section taken respectively along the lines II—II and III—III of Fig. 1.

Fig. 4 is a view in part cross-seection of this same frying pan, taken along the line IV—IV of Fig. 5.

Figs. 5 and 6 are views in cross-section along the lines respectively shown at V—V and VI—VI of Fig. 4.

Fig. 7 is a view in longitudinal cross-section of the combination of the two pieces, ready to be assembled one on the other.

Figs. 8 to 10 are views respectively in front elevation, side and in plan, of a metal member provided for supporting and handling the second piece.

Fig. 11 is a view similar to Fig. 7 and showing a modification thereof.

In Figs. 1 to 3, straight ribs are shown at 1, separated by deep grooves 2; the reference 3 refers to elementary ribs of smaller height associated only with the bottoms of the grooves 2 and forming barriers for the flow of fat.

The accessory of the frying pan is constituted by a movable handle 4 (Fig. 5) which facilitates packing for despatch or stacking in a kitchen cupboard; in addition, the body of the frying pan without handle can then be used as a simple roasting dish in the oven of a cooking stove.

In view of the considerable weight of a frying pan body with a thick bottom, it is essential that the connection of the removable handle should be very strong; this condition is perfectly met by the device described below, to which there is added an ease of fixing and removal such that it is possible to attach or remove the handle with a single hand without any locking device and without it being necessary to touch the body of the frying pan, this being a very appreciable advantage, enabling the two operations to be carried out on a frying pan in use, which is very hot; this arrangement furthermore does not exclude the provision of a locking device when so required.

On the annular portion 5 of the frying pan body, rising obliquely or vertically, is fixed a base member formed by a single metal plate 6, the upper and lower parts of which are bent over so as to form two slides 7 which, in the example shown, are parallel and horizontal, but which could also be parallel and curvilinear. The handle 4 terminates at its extremity which is connected to the frying pan, by a plate 8, the parallel upper and lower edges of which enable the plate to slide with a slight play into the slides 7 of the plate 6.

A simple horizontal movement enables the handle to be put in position; if this movement is effected from left to right, and if it is limited by an abutment (for example a simple folded portion 10 closing the right-hand extremity of one of the slides 7) a robust and simple assembly is obtained.

A right-handed user can then tilt the frying pan up to the vertical and can even completely invert it without any danger. The same operations carried out by a left-handed user would appear to be impossible, since the abutment 10 is no longer effective; practice has shown however that tilting towards the left, even up to the vertical, is still possible; in fact, the friction of the plate 8 in the slides 7 under the substantial couple due to the weight of the frying pan remains quite sufficient to prevent the frying pan from falling.

On the other hand, when the frying pan is resting flat, there is practically no friction, and the horizontal movements of the handle are very easily effected.

The handle 4 may be given any desired shape; it would appear however to be of particular advantage to give it a lever-handle profile and an oval section with its major axis vertical, these two features having formed the object of French Patent No. 909,352 in the name of the present applicant, of October 12, 1944.

In the accompanying drawings, the plate 8 is shown folded to a U-shape so as to pass over the heads of the rivets 11 which have been used to fix the plate 6 on the annular portion 5.

It is quite clear that the above connection device can be used for certain other kitchen articles such as saucepans, or camping utensils.

As shown in Figs. 7 and 11, the two parts are of rectangular shape, by way of example, the frying pan A being of thick aluminum with a flat upper edge 12. The roasting dish B, which is of fireproof glass, is provided with a lip or flange 13 and a bead 14 which serves on the one hand to fit into the frying pan A and, on the other hand, enables condensed water to fall back into the interior without dirtying the outer walls.

As shown in the drawing, the bottom of the roasting dish is preferably incurved at 15, Fig. 7, which enables the drops of condensation to collect at the centre, from which they fall, as has been proved during practical use. In this way, a kind of automatic basting of the food being cooked is obtained. The domed portion of Fig. 7 may further be replaced by a series of grooves or corrugations, as shown at 15a in Fig. 11, so as to provide a number of dripping points for the condensation.

It is well known that the handling of a utensil of glass is very awkward when it is very hot and requires the use of cloths.

The invention provides a remedy for this drawback by the use of a metallic member which is adapted with the greatest ease to the utensil and can be removed from it with the same ease, this frame carrying out three functions, for which it is provided with:

(a) A central handle enabling the dish used as the cover of the cooker to be lifted;

(b) Four feet on which the very hot plate can rest when taken out of the oven, in the case of its use as a roasting dish.

(c) Two side handles for conveniently carrying the dish to the table, when it is used as a serving dish.

A frame of this kind in a form of construction in round section rod, given by way of example, is shown in Figs. 8 to 10, in which the dish B of glass has been drawn in broken lines in order to simplify the drawing.

This frame, which can be made from a continuous rod or wire or from a number of elements assembled together, comprises a handle 16 located in the center of the outer face of the dish, and formed by two wires assembled together side by side. At the two feet of this handle 16, the wires leave diagonally to the dish and are bent to the form of feet 17, four in number, and having a height at least equal to that of the handle 16.

These four feet pass vertically downwards through slots 18 formed in the lip of the glass dish, and are formed by two successive bends into carrying handles 19 above the lips 13.

When the frame comprises the all-of-a-piece metallic wire, the wire has the form of two V-shaped side members in plan as the members leave diagonally to the dish as shown in Fig. 10. The V-shaped side members overlie the outer face of dish B and are connected to the ends or feet of handle 16. Each leg of the V-shaped side members has an outwardly extending portion $a$ which is lengthened by an inwardly extending portion $b$ substantially paralleling the lip or flange 13 of the dish B. The feet 17 are formed in the outwardly extending portions $a$ and are used to support the dish when it is used for serving. The handles 19 are shaped in the form of substantially horizontal members which connect the ends of the inwardly directed portions $b$. Gripping portions $c$ are provided at the ends of the inwardly directed portions $b$ and are engageable with the edge of the flange 13.

A further advantage of the handles 19 consists in that, in the use of the roasting dish B as the cover of the cooker, the two side handles 19 enable this cover to be placed on a table, or a draining board of earthenware or porcelain, thus preventing contact of the hot glass with a surface which would be liable to be damaged by heat, or especially the direct contact of the glass with earthenware or porcelain, which would quite often be liable to break the cover.

It will be understood that the wire frame is perfectly fixed to the dish by its own elasticity in all its positions, either normal (serving dish) or turned upside down (cooker cover). In order to free the dish, it is only necessary to pull apart the two handles 19 slightly.

What I claim is:

1. A cooking apparatus for a number of culinary uses composed of two pieces which can be used either associated so as to form a closed vessel for use as a casserole, or separately, said cooking apparatus comprising a pan with a thick bottom, a flanged dish thereon made of fireproof glass, a removable, elastic, and all-of-a-piece frame of metallic wire, overlying the flange and body of the said dish and having gripping portions engageable with the flange of said dish, said metallic wire including substantially horizontal portions and upwardly extending portions, a central handle for carrying the dish when used as a cover, said handle being shaped in the central portion of said metallic wire, two side handles for carrying the said dish when used in its flat position for serving, said side handles being shaped in the substantially horizontal portions of said metallic wire located between said gripping portions, and four feet, said feet being shaped in said upwardly extending portions of said metallic wire when the dish is used as a cover.

2. A cooking apparatus as in claim 1 further comprising horizontal slide means provided in the outer wall of the pan, a handle having slide means releasably slidably mounted in said horizontal slide means provided in the outer wall, and a folder portion closing the extremity of said horizontal slide means to prevent said handle escaping from its position.

3. A cooking apparatus for a number of culinary uses, comprising a metallic pan with a thick bottom, a flanged dish thereon made of fireproof glass, a removable, elastic, and all-of-a-piece frame of metallic wire, said frame having, a central member located in the center of the outer face of said dish, V-shaped side members in plan, overlying said outer face, at the ends of said central member, each leg of said side members having an outwardly extending portion lengthened by an inwardly directed portion substantially paralleling the flange of said dish, substantially horizontal members connecting the ends of said inwardly directed portions of each said members, gripping portions provided at the ends of said inwardly directed portions and engageable with the edge of said flange.

4. A cooking apparatus as in claim 3, comprising a handle for carrying the dish when used as a cover, said handle being shaped in said central member, two side handles for carrying the dish when used in its flat position for serving, said side handles being shaped in said substantially horizontal members, and four feet, shaped in said outwardly extending portions, for supporting the dish when it is used for serving.

5. A cooking apparatus as claimed in claim 1 further comprising a removable handle, and releasable means coupling said removable handle to the pan.

References Cited in the file of this patent

UNITED STATES PATENTS

| | | |
|---|---|---|
| 926,163 | Bauer | June 29, 1909 |
| 1,275,598 | Probst | Aug. 13, 1918 |
| 1,737,249 | Kempter | Nov. 26, 1929 |
| 2,077,757 | Jackson | Apr. 20, 1937 |
| 2,134,997 | Blandi | Nov. 1, 1938 |
| 2,135,225 | Sladky | Nov. 1, 1938 |
| 2,558,294 | Finizie | June 26, 1951 |
| 2,751,840 | Layton | June 26, 1956 |